(12) United States Patent
Störkel et al.

(10) Patent No.: US 10,687,925 B2
(45) Date of Patent: Jun. 23, 2020

(54) BRUSH HEAD AND ELECTRIC TOOTHBRUSH

(71) Applicant: Braun GmbH, Kronberg (DE)

(72) Inventors: Ulrich Störkel, Bad Nauheim (DE); Heidrun Schmelcher, Oberursel (DE); Niclas Altmann, Niddatal (DE); Anke Renz, Schwalbach (DE)

(73) Assignee: BRAUN GMBH, Kronberg (DE)

( * ) Notice: Subject to any disclaimer, the term of this patent is extended or adjusted under 35 U.S.C. 154(b) by 342 days.

(21) Appl. No.: 15/653,185

(22) Filed: Jul. 18, 2017

(65) Prior Publication Data

US 2018/0021116 A1 Jan. 25, 2018

(30) Foreign Application Priority Data

Jul. 22, 2016 (EP) ..................................... 16180792
Jul. 17, 2017 (WO) ........................... IB2017/054309

(51) Int. Cl.
| | |
|---|---|
| A61C 17/22 | (2006.01) |
| A46B 9/04 | (2006.01) |
| A61C 17/34 | (2006.01) |
| A46B 7/04 | (2006.01) |
| A46D 1/00 | (2006.01) |

(52) U.S. Cl.
CPC ............ *A61C 17/222* (2013.01); *A46B 7/046* (2013.01); *A46B 9/04* (2013.01); *A46D 1/0276* (2013.01); *A61C 17/3436* (2013.01)

(58) Field of Classification Search
CPC .............. A46B 9/04; A46B 7/04; A61C 17/22
See application file for complete search history.

(56) References Cited

U.S. PATENT DOCUMENTS

| | | | | |
|---|---|---|---|---|
| 4,882,803 | A * | 11/1989 | Rogers | A46B 9/04 15/167.1 |
| 5,546,626 | A * | 8/1996 | Chung | A46B 7/06 15/167.1 |
| 6,035,476 | A * | 3/2000 | Underwood | A46B 9/045 15/167.1 |
| 6,496,999 | B1 * | 12/2002 | Gleason | A46B 9/045 15/167.1 |
| 7,419,225 | B2 | 9/2008 | Fischer et al. | |

(Continued)

FOREIGN PATENT DOCUMENTS

EP 596633 A1 * 11/1994

OTHER PUBLICATIONS

International Search Report with Written opinion, dated Oct. 11, 2017, 15 pages.

(Continued)

*Primary Examiner* — Michael D Jennings
(74) *Attorney, Agent, or Firm* — Vladimir Vitenberg

(57) ABSTRACT

A brush head for an electric toothbrush comprises an attachable housing and a carrier having a mounting side and mounted for driven oscillatory rotational motion around a rotation axis that extends through a center point on the carrier's mounting side. Each of the tufts has a tufting area of at least about 2.0 mm². Filaments in each of the tufts have a cross-sectional area perpendicular to their length extension direction that corresponds to a circular cross sectional area having a diameter in the range of between 140 μm and 102 μm, wherein the brush head comprises only tufts of the defined type.

20 Claims, 6 Drawing Sheets

(56) References Cited

U.S. PATENT DOCUMENTS

| | | | |
|---|---|---|---|
| 8,185,993 B2 | 5/2012 | Fischer et al. | |
| 8,341,792 B2 | 1/2013 | Fischer et al. | |
| 8,621,699 B2 | 1/2014 | Fischer et al. | |
| 8,990,996 B2 * | 3/2015 | Waguespack | A46B 5/021 15/167.1 |
| 9,681,933 B2 | 6/2017 | Fischer et al. | |
| 2002/0138926 A1 * | 10/2002 | Brown, Jr. | A46B 9/025 15/22.1 |
| 2003/0163881 A1 * | 9/2003 | Driesen | A46B 9/025 15/22.1 |
| 2004/0200016 A1 | 10/2004 | Chan et al. | |
| 2005/0060822 A1 | 3/2005 | Chenvainu et al. | |
| 2005/0273952 A1 | 12/2005 | Chan | |
| 2006/0096053 A1 | 5/2006 | Fischer et al. | |
| 2006/0156495 A1 | 7/2006 | Chan et al. | |
| 2006/0282963 A1 | 12/2006 | Brown, Jr. | |
| 2007/0130705 A1 | 6/2007 | Chan | |
| 2008/0148502 A1 | 6/2008 | Fischer et al. | |
| 2008/0172814 A1 | 7/2008 | Brown | |
| 2008/0238182 A1 | 10/2008 | Fischer et al. | |
| 2010/0132141 A1 | 6/2010 | Chan | |
| 2010/0162499 A1 * | 7/2010 | Braun | A46B 5/0025 15/22.1 |
| 2010/0227201 A1 | 9/2010 | Sasaki et al. | |
| 2010/0306941 A1 * | 12/2010 | Erskine-Smith | A46B 9/026 15/167.1 |
| 2011/0179595 A1 | 7/2011 | Chenvainu | |
| 2011/0283470 A1 * | 11/2011 | Gatzemeyer | A46B 13/02 15/28 |
| 2013/0007969 A1 | 1/2013 | Driesen et al. | |
| 2013/0086759 A1 | 4/2013 | Fischer et al. | |
| 2014/0082866 A1 | 3/2014 | Fischer et al. | |
| 2014/0101871 A1 | 4/2014 | Chenvainu et al. | |
| 2017/0281323 A1 | 10/2017 | Fischer et al. | |

OTHER PUBLICATIONS

Marsha A. Voelker et al: "Catalogue of tooth brush head designs", The Journal of Dental Hygiene. vol. 87, No. 3. Jun. 1, 2013 (Jun. 1, 2013), pp. 118-133, PO55322760. table 3.

\* cited by examiner

BRUSH HEAD AND ELECTRIC TOOTHBRUSH

FIELD OF THE INVENTION

The present disclosure is concerned with a brush head comprising a plurality of tufts consisting of filaments and it is concerned with an electric toothbrush comprising such a brush head.

BACKGROUND OF THE INVENTION

It is known that brush heads of electric toothbrushes usually comprise a plurality of tufts consisting of filaments and that the tuft arrangement can take various forms as there is a high variability in the tuft shapes, tuft sizes, and filament types. Thus, a plethora of different tuft arrangements were proposed for different brushing objectives, e.g. for optimal cleaning, for optimal gum massage, for sensible users, for interdental cleaning etc.

A high percentage of users prefer soft brush heads as the respective users may have highly sensitive gums or a general fear of enamel abrasion and gum irritation associated with medium to hard brush heads. While soft brush heads are known as such, it represents a challenge to combine a soft brushing impression with a good cleaning efficacy.

It is thus an object of the present disclosure to provide a brush head and an electric toothbrush comprising a brush head that are improved over known brush heads or at least represent an alternative to known brush heads, where the brush head comprises a tuft arrangement that is gentle in use, while still having a good cleaning efficacy.

SUMMARY OF THE INVENTION

In accordance with an aspect there is provided a brush head for an electric toothbrush, in particular a replaceable brush head, comprising (a) a housing attachable to and detachable from a handle of the electric toothbrush, (b) a carrier having a mounting side, in particular having a circular, oval or elliptical mounting side, which carrier is mounted at the housing for driven oscillatory rotational motion around a rotation axis that extends through a center point on the mounting side of the carrier, and (c) wherein each of the tufts has a tufting area of at least about 2.0 mm$^2$, in particular of at least about 2.80 mm$^2$, and the filaments in each of the tufts have a cross-sectional area perpendicular to their length extension direction that corresponds to a circular cross sectional area having a diameter in the range of between 140 μm and 102 μm, in particular of about 127 μm, in particular wherein the brush head comprises only tufts of the defined type.

In accordance with an aspect there is provided an electric toothbrush comprising such a brush head.

BRIEF DESCRIPTION OF THE DRAWINGS

The present disclosure is further elucidated by a detailed description of example embodiments and with reference to figures. In the figures

DETAILED DESCRIPTION OF THE INVENTION

Figure 1:
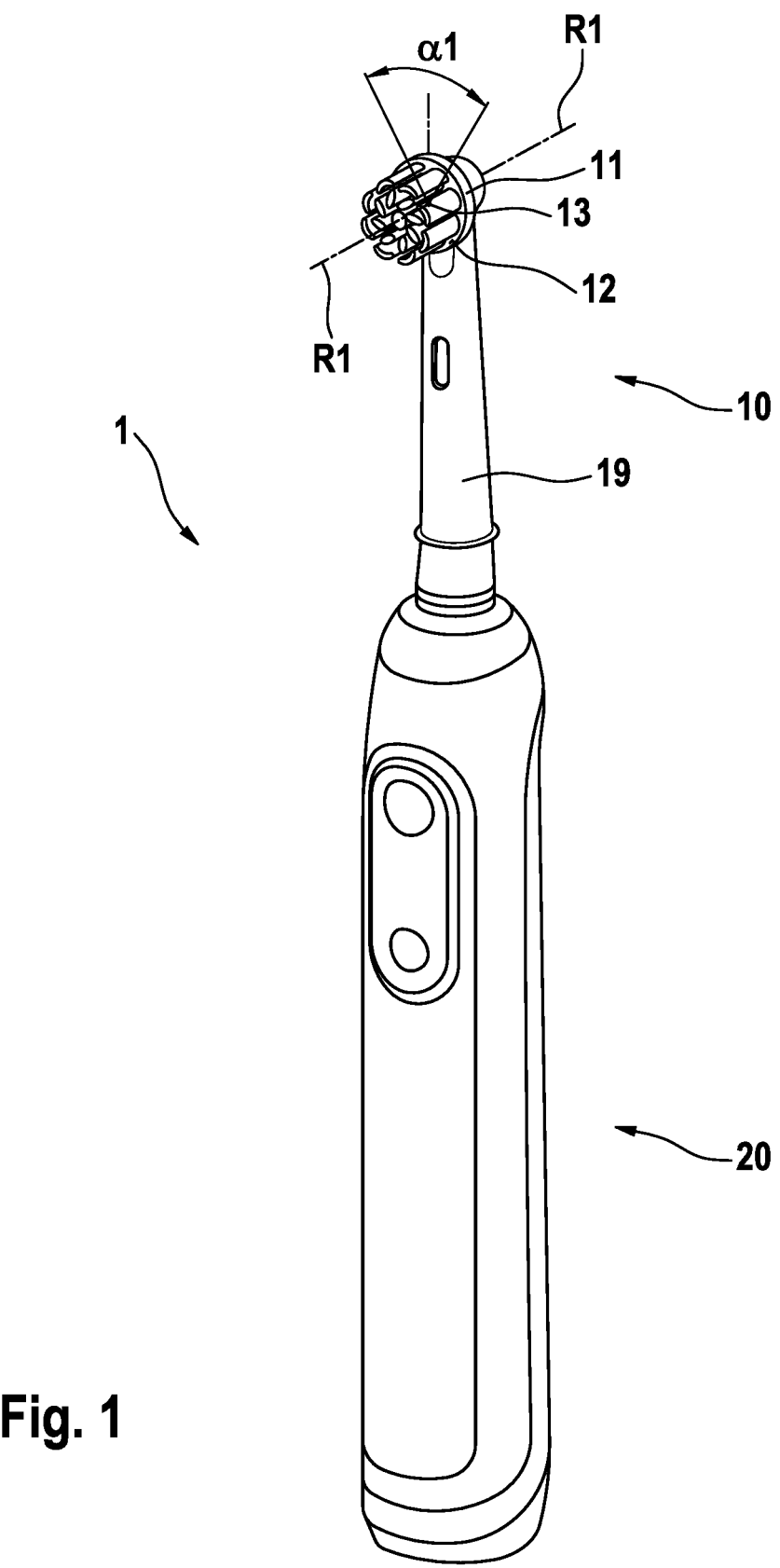
FIG. 1 is a schematic depiction of an electric toothbrush as proposed comprising a brush head, which in particular may be a replaceable brush head.

A brush head of an electric toothbrush, in particular a replacement brush head—i.e. a brush head that can be repeatedly attached to and detached from a handle of an electric toothbrush—as proposed herein comprises tufts having filaments of a particular thin diameter in a range of between 140 μm (5.5 mil) and 102 μm (4.0 mil) (optionally, the lower range value is 114 μm (4.5 mil)), in particular of below 135 μm, and further in particular of about 127 μm (5 mil). In particular, a brush head as proposed comprises only tufts having filaments in the given diameter range. In some embodiments, at least 50%, 60%, 70%, 80%, or 90% of the tufts of the brush head consist of filaments in the proposed range. While one focus of the present disclosure is on brush heads that only comprise tufts consisting of the mentioned thin filaments, it shall generally not be excluded that additional elastomeric elements are disposed on the brush head as well (the elastomeric elements then not being considered as tufts). Elastomeric elements can support the gentle impression and may add further benefits of the brush head such as a gum massage feature.

Filaments used for toothbrushes (e.g. available from DuPont, Del., USA) often have a circular cross-sectional shape so that the cross-sectional area can be directly computed from the diameter, but other shapes are possible and are used as well, e.g. flower-like cross-sectional shapes, triangular shapes etc.—the cross-sectional area of these non-circular filaments shall then have the same value as the respective circular filaments mentioned above, i.e. the cross-sectional area shall be lower than about 15,394 μm$^2$ (which area relates to a circular filament having a diameter of 140 μm). It had been found that filaments being such thin create the impression of gentleness during brushing. This is essentially caused by the bending stiffness of the filaments, which becomes drastically reduced when the diameter is reduced due to the dependency of the bending stiffness on the fourth power of the radius of a circular filament. It was found with respect to the present disclosure that tufts comprising thin filaments should have a relatively high tufting area (i.e. the area of the tuft in a plane perpendicular to the height extension direction of the tuft at the level of the mounting side) to counterbalance the reduced bending stiffness of the individual filament. Typical tufting areas for regular toothbrushes are often circa 1.77 mm$^2$ for a circular tuft having a diameter of 1.5 mm. It was found that tufts having only thin filaments in the range as mentioned should have a cross-sectional area of at least about 2.0 mm$^2$, in particular of at least about 2.2 mm$^2$, of at least about 2.4 mm$^2$, of at least about 2.6 mm$^2$, and further in particular of at least about 2.8 mm$^2$. By increasing the tufting area of a tuft, the lower bending stiffness of the individual thin filaments is counterbalanced in a manner that keeps the gentleness feeling but increases the stability of the tuft and thus supports effective cleaning. Thus, a brush head having only tufts with filaments of below about 140 μm (in particular of about 127 μm) and where each tuft has a cross-sectional area of at least 2.0 mm$^2$ (in particular of at least about 2.8 mm$^2$) provide a good gentleness impression (i.e. are experienced by users as a "soft" brush) in combination with good cleaning efficacy due to the large tufting area of the tufts that counterbalances the low bending stiffness of the thin filaments. In particular, the brush head thus comprises only tufts having a tufting area as proposed and a filament diameter as proposed. This shall not exclude that other cleaning elements such as elastomeric elements are present as well, but in some embodiments the plurality of cleaning elements of a brush head as proposed only consist of tufts as proposed. In some embodiments, at least 50%, 60%, 70%, 80%, or 90% of the tufts of the brush head are tufts as proposed (thin filaments plus large area).

The length of a filament between the mounting side of the carrier and its free end may be in the range of between 5.0 mm to 12.0 mm, in particular in the range of between 7.5 mm and 9.0 mm. While many standard brush heads have an average filament length of below 8.0 mm (e.g. the Oral-B Precision Clean (EB17) brush head had 18 tufts with a filament length of 7.5 mm and only six tufts for interdental cleaning with a filament length of 8.2 mm, so that an average filament length of 7.675 mm was achieved), the gentleness of the brush head can be improved with an average filament length of at least about 8.0 mm, in particular of at least 8.2 mm, and further in particular of at least 8.4 mm. The bending stiffness of a filament decreases with increasing length and thus the gentle feeling of the brush can enhanced by increasing the length of the filaments, while the length may not be arbitrarily increased as very long filaments bend to easily away and do not provide good cleaning performance anymore. Some tufts may comprise filaments of different lengths and some tufts may comprise only filaments of the same length. Tufts having filaments of different length may be arranged such that the free ends of the filaments lie on a common surface (i.e. a planar surface that is inclined versus the mounting side surface of the carrier). In particular, at least a sub-plurality of tufts disposed on the circumference of the brush head may have a filament length of at least 8.5 mm. In some embodiments, each tuft has at least about 130 filaments, in particular at least about 140 filaments. Due to the thin filaments and the large area of the tufts as proposed herein, a brush head of a standard size can comprise at least 2000 filaments, in particular at least 2500 filaments, further in particular about 2700 filaments (e.g. the above mentioned Oral-B Precision Clean brush head had 1248 filaments). While the filaments proposed herein are thinner than those used in known brush heads, they still each provide a tip that during brushing acts on the tooth surface and removes plaque, which results in improved cleaning efficacy due to the higher amount of filament tips.

In some embodiments, a tuft is arranged in the center of the carrier (a "center tuft") and has a tufting area of at least about 4.0 mm$^2$, of at least about 4.5 mm$^2$, or at least about 5.0 mm$^2$. It was found that the center of the brush head is usually placed on the center of a tooth that is being brushed. It is recommended that a user applies a certain force onto the tooth for optimal cleaning without side-effects (e.g. irritation of the gums). A center tuft having a tufting area of e.g. about 2 mm$^2$ may essentially collapse (i.e. the filaments of the tufts individually bend away) under the applied force because of the low bending stiffness of the thin filaments. Thus, a larger tufting area of the center tuft was found to at least partially overcome such a tendency. The center tuft may in particular comprise at least about 250 filaments or at least about 300 filaments. In some embodiments, a center tuft consists of filaments that have a diameter of above 140 μm, e.g. about 152 μm (6 mil). As the filaments of a center tuft of an oscillatory rotating brush head make the smallest motion paths, the overall gentleness impression is not strongly affected by the thickness of the filaments of a center tuft and the thicker filaments may then improve the stability of the center tuft. Tufts having their center of area at a distance to the center point of the mounting side of not more than 3.0 mm (optionally of not more than 2.0 mm or 1.0 mm or 0.5 mm or 0.2 mm) may be considered a center tuft.

It has further been found that filaments having a tapered free end (i.e. the end of the filament that is not connected with the carrier, the latter end being the "mounting end") enhance the impression of gentleness (a filament with a tapered free end may also be called a "tapered filament"). Thus, in some embodiments at least a sub-plurality of tufts mounted on the carrier each comprise at least one tapered filament (such a tuft having at least one tapered filament being called a "tapered tuft"). A tapered filament may have a length of tapering from the free end towards the mounting end of the filament in the range of between 1.0 mm to 8.0 mm, in particular may have a tapering length of at least 2.0 mm, at least 3.0 mm, at least 4.0 mm, at least 5.0 mm, or at least 6.0 mm. The remainder of the filaments has than a constant thickness (or cross-sectional area).

But it was found that users tend also to underestimate the cleaning efficacy of the filaments having a tapered free end due to their gentleness and may apply too much pressure when using such a brush head. Under too much pressure, the tapered filaments may be perceived as being poky to the gums. Thus, while it is not excluded that at least one tuft of the sub-plurality of tapered tufts comprises only tapered filaments (also called: "fully tapered tuft"), it is also considered that a tuft comprising elsewise tapered filaments comprises a small percentage in the range of between 1% and 20% of non-tapered filaments (also: "mixed tapered tuft"), i.e. filaments that are essentially flat at their free end (a so-called end-rounding potentially resulting in more or less semi-spherical free ends of the filaments shall not be considered as a tapering in the meaning of the present application but are considered as flat). It has been found that a combination of a relatively small percentage of non-tapered filaments in a mixed tapered tuft (the other filaments being tapered filaments) does not strongly reduce the gentleness impression in comparison to a fully tapered tuft, but increases the feeling of cleaning efficacy so that the user does not apply as much force as with a fully tapered tuft. The percentage of non-tapered filaments may in particular be in the range of between 2% and 10%, further in particular in the range of between 4% and 8%. In particular, the mixed tapered tufts may be disposed at the circumference of the mounting side (e.g. in the form of an outer ring-arrangement of mixed tapered tufts).

It is contemplated that the tufts described in the present disclosure can be connected to a carrier via an anchor technology (also called "stapling" technology, where long filaments are bent around their center and are connected to the carrier having mounting holes by means of an anchor wire that is hammered into the carrier material surrounding the mounting holes) or via an anchor-free technology (also called "hot tufting" technology, where tufts of filaments are typically molten together on the mounting end and/or where the carrier is injection molded around the mounting ends). While one may say that the bent filaments of the stapled tufts have two free ends, it shall be considered for the purposes of the present disclosure that a bent filament represents two filaments each having a free end and a mounting end connected with the carrier. While anchor technology has some limitations over hot tufting technology, complex shaped tufts may be made by anchor technology by placing mounting holes in close neighborhood to each other and by giving the mounting holes shapes, which each guide the shape of a group of filaments mounted into the hole and as a group of mounting holes together guide the shape of a complex shaped tuft.

In some embodiments, the plurality of tufts of the brush head comprises a sub-plurality of tufts that are arranged in an essentially ring-like arrangement (i.e. the locations of the center points of the tufting area of each of the tufts of the sub-plurality on the level of the mounting side lie essentially on a circle or an oval or an ellipse or deviate from being located on such a ring by a distance to the ring of less than about 20% of an average radius of the ring, in particular of less than 15% or less than 10% or less than 5%), in particular wherein a center point of the ring-like arrangement essentially coincides with the center point on the mounting side of the carrier. The eccentricity of the "ring" may be lower than 0.94. In some embodiments, two or more such ring-like arrangements are mounted on the carrier, where in particular the second ring-like arrangement lies fully within the first ring-like arrangement, in particular a polygon formed from the lines connecting the center points of the tufts of the first ring (i.e. from the first sub-plurality of tufts), which polygonal structure approximates the ring-shape, fully envelopes the respective polygonal line of the tufts of the second ring (i.e. from the second sub-plurality of tufts).

In some embodiments, the cross-sectional shape of a tuft in a plane perpendicular to the height extension direction of the tuft is elongated, i.e. the cross-sectional shape of the tuft is an ellipse or it fits into an approximation ellipse, which approximation ellipse is the ellipse with the smallest area into which the elongated cross-sectional shape of the tuft fits. If the cross-sectional shape is an ellipse, this ellipse is also the approximation ellipse for this tuft. The approximation ellipse has a major axis and a minor axis. In some embodiments, the tufts of a sub-plurality of tufts are essentially ring-like arranged and each of the tufts has an elongated cross-sectional shape on the level of the mounting side, where the major axis of the respective approximation ellipse is inclined with respect to a radial line from the center point of the mounting side to the center of the approximation ellipse, which inclination is in a range of between ±5° and ±85°, which means that the angle lies in a range of between 5° and 85° or in a range of between −5° and −85°. In some variants of these embodiments, all inclination angles are either positive or negative. In some variants of these embodiments, all inclination angles are identical or lie in a range having a width of maximally 20° or maximally 15° or maximally 10° or maximally 5°, e.g. the inclination angles may all be positive and may lie in the range of between 35° and 55° (range width is 20°). Such an inclined elongated tuft mounted on an oscillating-rotating carrier of brush head moves with its wider side against the plaque on the tooth surface and guides loosened plaque to the ends of the elongated tuft because of the inclination.

While the term "elongated cross-sectional shape" was above not specified other than by reference to an approximation ellipse into which the elongated shape fits, the elongated shape may in some embodiments be defined as a star domain where in the area of the star domain at least one point can be found from which all other points of the star domain are visible. In particular such star domains being banana-shaped, kidney-shaped, oval, rectangular, or lozenge-shaped shall be considered as an elongated cross-sectional shape within the meaning of the present disclosure.

In some embodiments, two ring-like arrangements of sub-pluralities of tufts are mounted on the mounting side of the carrier, where one ring-like arrangement (the "inner ring" of tufts) is located inside another ring-like arrangement of tufts (the "outer ring" of tufts). In variants of these embodiments, the tufts of at least the outer (alternatively of the inner) ring have an elongated cross-sectional shape and are inclined as described in the previous paragraphs, in particular each of the tufts of a ring are positively or negatively inclined. In some variants of the previous embodiments, also the tufts of the inner (alternatively of the outer) ring have an elongated cross-sectional shape and are inclined, in particular all tufts of the two rings may be positively or negatively inclined, and further in particular the tuft of the inner ring may have the same general inclination direction (i.e. positive or negative inclination) as the tufts of the outer ring. In variants of these embodiments, the sub-plurality of tufts of the outer ring are all mixed tapered tufts and the sub-plurality of tufts of the inner ring are all made solely from filaments that have a non-tapered free end ("non-tapered tufts"). An additional center tuft may be mounted in the center of the mounting side, in particular where the center tuft has a tufting area of at least about 5.0 mm$^2$. Then the inclination of the tufts of the inner ring and/or the outer ring may be chosen such that a line extending along the major axis of each of the approximation ellipses does not cross the tufting area of the center tuft. A force acting during brushing along the major axis of an approximation ellipse of a tuft will then essentially not be able to bend the tuft such that it collides with the central tuft.

In some embodiments, the tufts of a sub-plurality of tufts forming a ring-like arrangement may all have the same cross-sectional shape.

The mounting side of the carrier in accordance with the present disclosure comprises large area tufts with thin filaments, in particular where all the tufts of the brush head have the mentioned large area and the mentioned thin filaments. The filaments may have an average length of at least 8.0 mm as described before. A typical distance between the borders of neighboring tufts (or between the border of a tuft and an edge of the carrier) is about 0.8 mm in order to provide carrier walls around the mounted tufts that withstand required tuft retention forces. Because of the large area tufts, lesser tufts are mounted on the carrier than it would be the case with small area tufts (e.g. of about 1.77 mm$^2$ or even smaller area tufts), which also means that the area needed for the mentioned stability and to provide high retention forces is lower than for brush heads with small area tufts. The filament density on a carrier as proposed herein may thus have a value of at least 15 filaments per square-millimeter and in particular of at least 18 filaments per square-millimeter. Taking into account that the carrier may be 0.8 mm larger than the edges of the outer tufts, the tufted area of a brush head as proposed may be larger than 25% of the area of the mounting side, in particular larger than 28%, further in particular larger than 30% and may reach about 35%. The area of the mounting side may be in a range of between 120 mm$^2$ and 200 mm$^2$, in particular in a range of between 140 mm$^2$ and 180 mm$^2$.

In one aspect, an electrical toothbrush comprises a replacement brush head in accordance with the present disclosure. In some embodiments, the brush head comprises at least one tapered, mixed tapered or fully tapered tuft. The electric toothbrush may then be arranged to drive the carrier into an oscillating rotation having an oscillation angle such that the mounted ends of the tapered filaments move along a path of more than 3.0 mm per half-cycle of each oscillation period, in particular of at least 3.1 mm and even further in particular of at least 3.2 mm or at least 3.3 mm or at least 3.4 mm.

FIG. 1 is a schematic front view onto an example electric toothbrush 1 is accordance with the present disclosure. The electric toothbrush 1 comprises a brush head 10 and a handle 20. The brush head 10 may in particular be arranged as a replacement brush head, i.e. a brush head arranged for repeated attachment and detachment from the handle 20. The brush head 10 comprises a carrier 11 that is mounted for driven oscillating-rotational movement with respect to a housing 19 of the brush head 10. The rotation axis R1 extends through a center point 13 of a mounting side 12 of the carrier 11 (the center point 13 does not necessarily need to be at the center of area of the mounting side 12 but may deviate therefrom). The carrier 11 comprises a plurality of tufts made from thin filaments. In the embodiment as shown, no further cleaning elements, e.g. elastomeric elements are mounted on the mounting side 12 of the brush head 10, but, as was explained before, in some embodiments such elastomeric elements are present. The electric toothbrush 1 is arranged such that a drive moves the carrier into an oscillating-rotational movement having a deflection angle value of $\alpha 1/2$ (i.e. a peak-to-peak deflection of an angle value $\alpha 1$). The peak-to-peak deflection angle value $\alpha 1$ may lie in a range of between 10° to 90°, in particular in a range of between 15° and 60°, further in particular in a range of between 20° and 50°.

Figure 2:
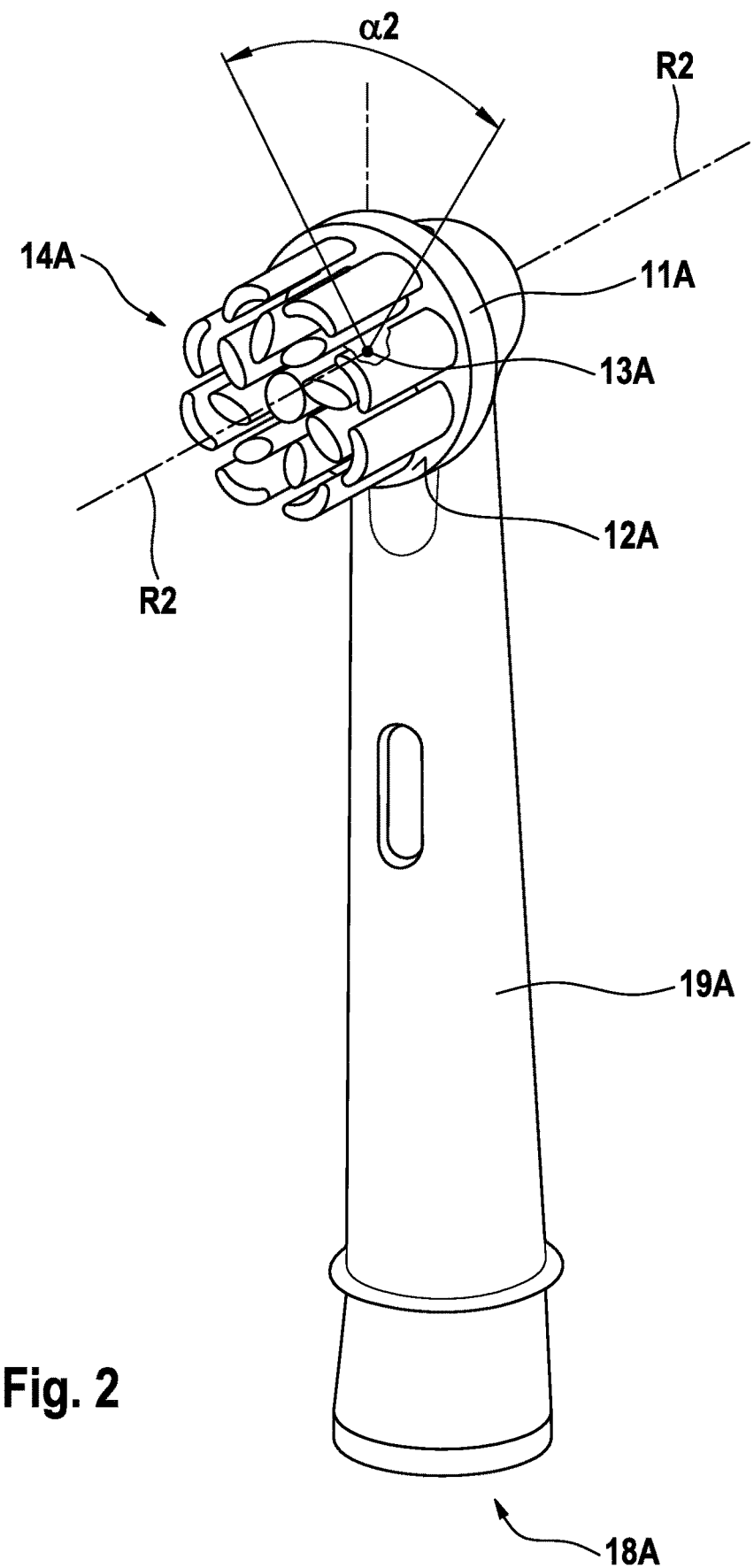
FIG. 2 is a schematic depiction of an example replaceable brush head in accordance with the present disclosure.

FIG. 2 is a schematic perspective depiction of an example brush head 10A in accordance with the present disclosure, which brush head 10A is realized as a replacement brush head. The brush head 10A comprises a carrier 11A that is mounted at a housing 19A of the brush head 10A for driven oscillating-rotational motion around a rotation axis R2. The rotation axis R2 extends through a center point 13A on a mounting side 12A of the carrier 11A. The housing 19A of the brush head 10A is essentially hollow (a motion transmitter may be disposed in the hollow housing 19A to couple a drive shaft of a handle (e.g. handle 20 shown in FIG. 1) with the carrier 11A. The housing 19A has thus an opening 18A for receiving a drive shaft section of the handle.

Figure 3B:
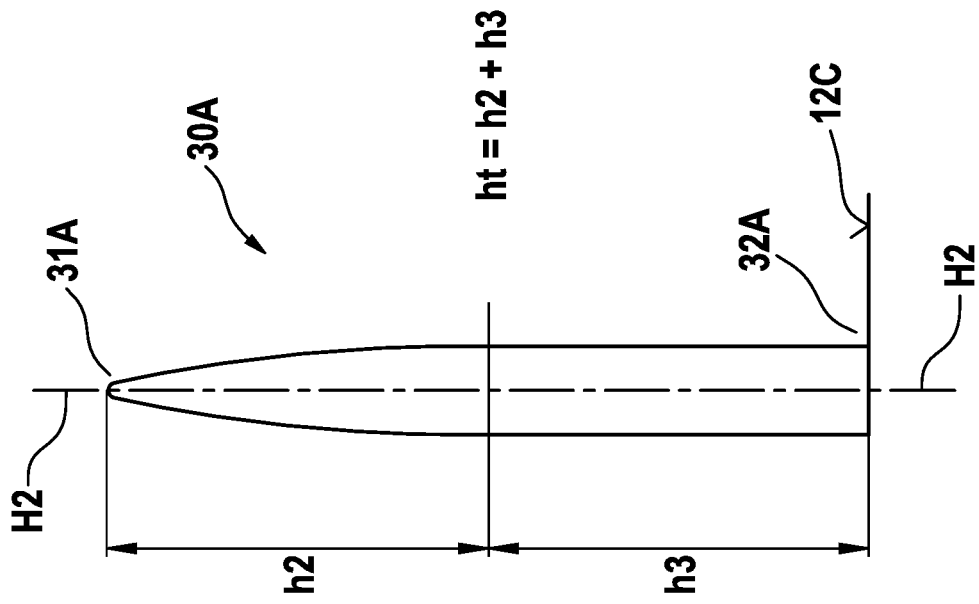
FIG. 3B is a depiction of an example tapered filament.
Figure 3A:
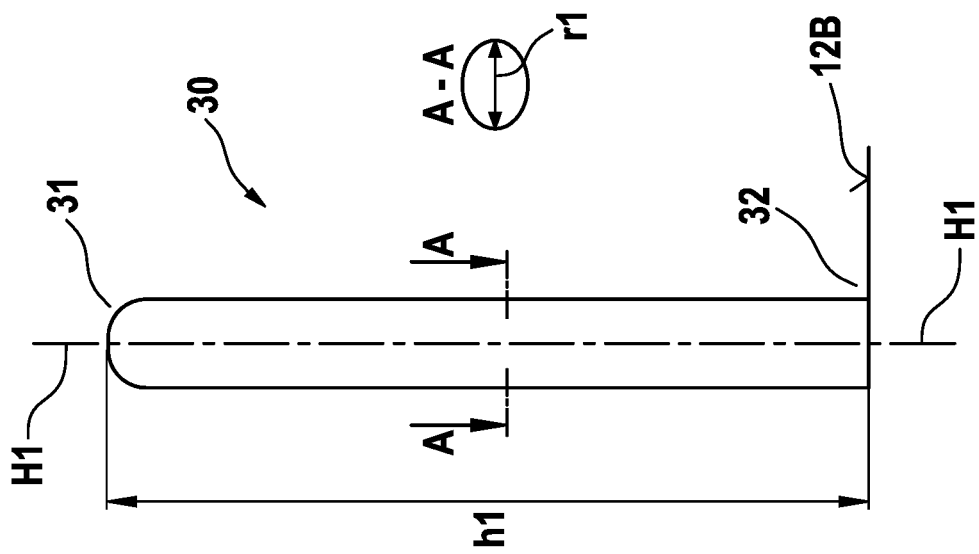
FIG. 3A is a depiction of an example non-tapered filament.

FIG. 3A is a schematic depiction of a filament 30 that is mounted with a mounting end 32 on a mounting side 12B of a carrier. The filament 30 shown is a non-tapered filament that has a free end 31 that is either essentially flat (the filament 30 may have been cut at the free end 31) or that is slightly or considerably rounded at the free end 31 (so-called end-rounding). The end-rounding may just deburr (or chamfer) the circumferential edge of the flat free end 31, but the free end 31 may be essentially semi-spherical after considerable end-rounding (for the end-rounding, the free ends of the filaments are grinded on an abrasive surface such as sandpaper as is generally known in the art). The filament 30 shown in FIG. 3A has a circular cross-sectional shape in a plane perpendicular to a height extension direction H1 (this plane is indicated by line A-A) and the filament 30 extends along a height h1 between the mounting end 32 of the filament 30 and the free end 31 of the filament 30. Hence, the filament 30 is essentially of a cylindrical form, where the cylinder has a diameter r1 as is shown in the detail showing the cross-sectional shape of the filament 30 in the plane A-A.

The filaments considered in the present application have a diameter r1 in a range of between below 140 µm (5.5 mil) and 102 µm (4.0 mil) (optionally, where the lower range value is 114 µm (4.5 mil)), in particular of below 135 µm or below 130 µm, further in particular of about 127 µm (5 mil). While FIG. 3A shows a filament having a circular cross sectional shape (a "circular filament"), other cross-sectional shapes (e.g. elliptical, triangular, square, quadratic, flower-like, oval, elongated, x-shaped, quadrilobal etc.) are possible as well. The filaments may also have hollows, e.g. the filaments may have a trilocular or tetralocular cross sectional shape. The cross-sectional area of these non-circular filaments is then understood to lie in the same range as the area of the circular filaments (i.e. between 8,171 µm$^2$ and 15,394 µm$^2$). Instead of a flat end, the filaments may also have other free ends, e.g. the free ends may be spliced. The filaments may also deviate from a plain cylindrical shape and may be crimped or dimpled or twisted or otherwise structured. The filaments may be made from a single material (e.g. a thermoplastic material) or may be made from two materials (e.g. via co-extrusion or by coating). Typical materials for making filaments for toothbrushes are polyamide (e.g. PA 6.12 or PA 6.10 or PA 6.6) or polybutylene terephthalate (PBT). Polyethylene, polypropylene, polyvinylidene chloride, polyester, and polyurethane are also possible filament materials. Further materials include thermoplastic elastomers (TPE). A wide variety of synthetic filaments are, e.g., available from DuPont, Del., USA.

FIG. 3B is a schematic depiction of a filament 30A that is tapered towards its free end 31A (a "tapered filament") and is mounted on a mounting side 12C of a carrier at its mounting end 32A. The tapered filament extends along a height extension direction H2 and has a length ht, where the tapered filament 30A extends first along a height h3 from the mounting end 32A towards the free end 31A without any tapering and then the tapered section of the tapered filament extends along a length h2 so that ht=h2+h3. The tapered length h2 typically lies in a range of between 1.0 mm to 10.0 mm, in particular in a range of between 3.0 mm and 8.0 mm, and further in particular in a range of between 5.0 mm and 7.0 mm. The tapered filament may receive its tapering by mechanical grinding, but chemical tapering is generally a more common process. In chemical tapering, the filaments are dipped into a chemical solution that etches away filament material. Various forms of tapered filaments can be achieved, but it is common for tapered filaments that they have a considerable thinning at the free end so that they feel gentle in use. Obviously, the bending characteristics of tapered filaments are changed over a non-tapered filament. While a tapered filament may have a generally circular cross-sectional shape, other cross sectional shapes as discussed for the non-tapered filaments are possible as well. To the extent the present disclosure defines filament diameters or cross-sectional areas it shall be understood that these are defined for the non-tapered portion of a tapered filament.

Figure 4B:
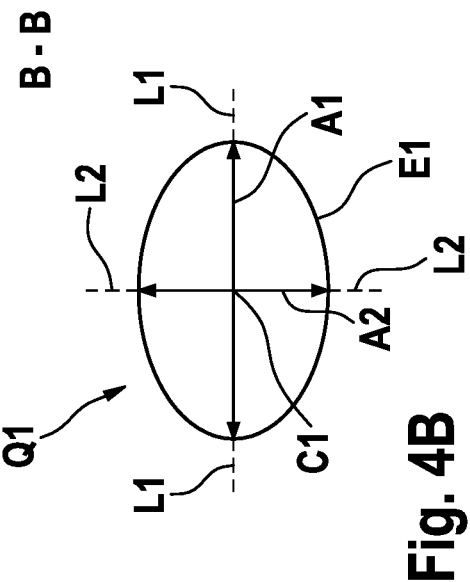
FIG. 4B is a depiction of the elongated (here: elliptical) cross-sectional shape of the tuft shown in FIG. 4A taken along plane B-B.
Figure 4A:
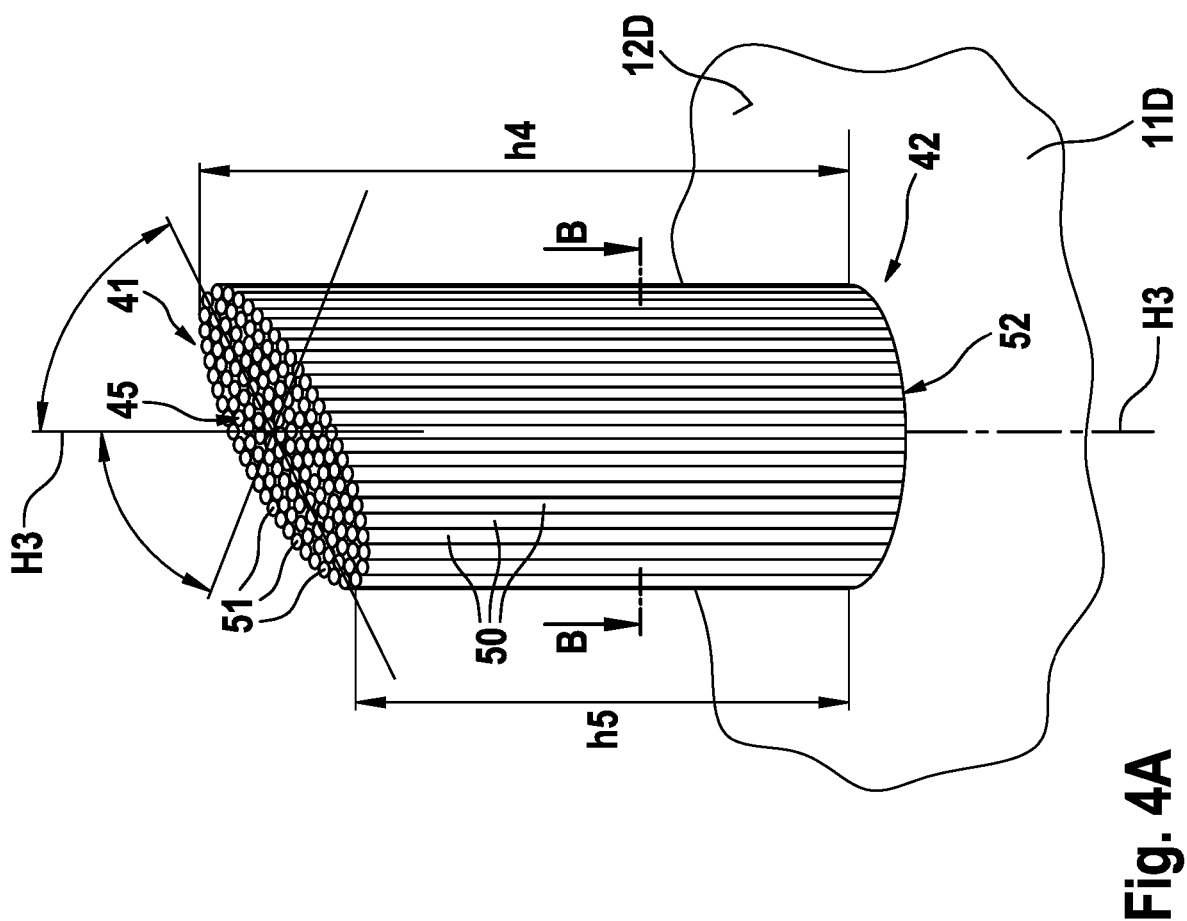
FIG. 4A is a schematic depiction of an example tuft consisting of filaments, which tuft is mounted on a mounting side of a carrier.

FIG. 4A is a schematic depiction of a tuft 40 made from filaments 50. While here no differentiation is made between different filaments 50 it is understood that the tuft 40 may comprise different filament types, e.g. a mixture of cylindrical non-tapered filaments and of cylindrical tapered filaments, but other mixtures are possible as well and in particular the tuft 40 may comprise as many different filament types as it comprises filaments (this also holds for any tuft described herein). This shall not exclude that all the filaments 50 are identical (besides their length for the concrete example shown in FIG. 4A). Each of the filaments 50 has a free end 51 and a mounting end 52. The tuft 40 is mounted on a mounting side 12D of a carrier 11D. The tuft 40 extends along a height extension direction H3, but the filaments 50 of the tuft 40 all have a different height so that the free ends 51 of the filaments lie, e.g., on a common end surface 45 that is inclined with respect to the height extension direction H3 as is shown in FIG. 4A. Instead of a flat end surface 45 as shown, the end surface of the tuft may be curved or the filaments 50 of the tuft 40 may have all a randomly distributed different height so that no smooth end surface results. In the shown example embodiment, the tuft 40 has an inclined smooth end surface 45 so that the tuft 40 has a maximum height h4 that is achieved on one edge of the tuft 40 and a minimum height h5 that is achieved on an opposite edge of the tuft. The tuft 40 has a free end 41 formed by the free ends 51 of the filaments 50 and a mounting end 42.

FIG. 4B is a depiction of an example cross-sectional shape Q1 of the tuft 40 as shown in FIG. 4A. Here, the cross-sectional shape Q1 was taken along a plane B-B that is perpendicular to the height extension direction H3 as is indicated in FIG. 4A. The cross-sectional shape Q1 is here elongated and specifically elliptical as one example of an elongated shape. The elliptical cross-sectional shape Q1 has a major axis A1 and minor axis A2 that are perpendicular to each other. The major axis A1 extends along a major axis extension direction L1 and the minor axis A2 extends along a minor axis extension direction L2.

Figure 5:
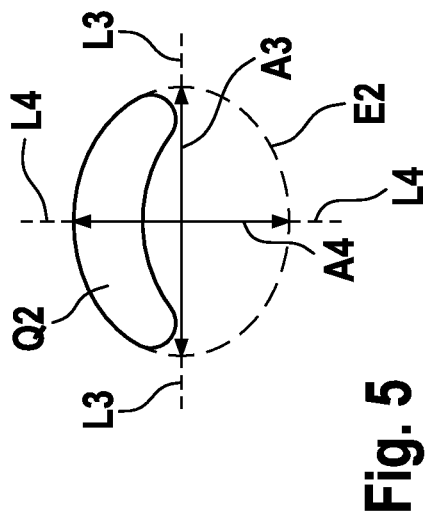
FIG. 5 is a depiction of an example elongated cross sectional shape and the related approximation ellipse.

FIG. 5 is a depiction of another example cross-sectional shape Q2 of a tuft, which cross-sectional shape Q2 is essentially elongated, i.e. the shape has an extension length in one direction that is larger than the extension length in all other directions. The cross-sectional shape Q2 shown in FIG. 5 is essentially banana-like. FIG. 5 also shows an approximation ellipse E2 that is the ellipse having the smallest area of all ellipses that comprise the elongated cross-sectional shape Q2 (the approximation ellipse may be found by a numerical optimization). With respect to the approximation ellipse E2, it is then possible to also define a major axis A3 and a minor axis A4 of the elongated cross-sectional shape Q2. Again, the major axis A3 of the approximation ellipse E2 extends along a major axis extension direction L3 and the minor axis A4 extends along a minor axis extension direction L4.

Figure 6:
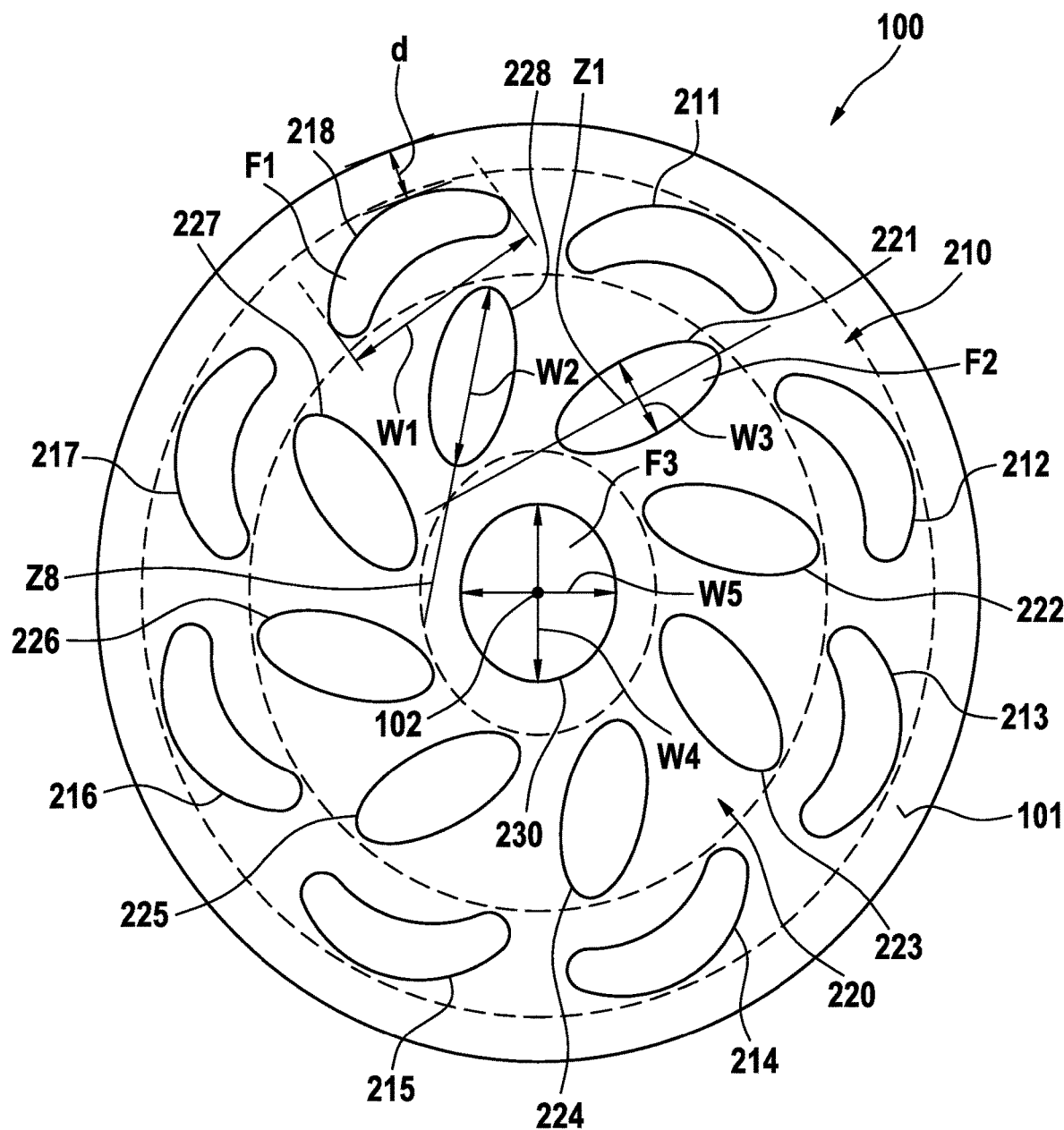
FIG. 6 is a top view onto an example mounting side of a carrier where the tufting areas of a plurality of tufts are shown.

FIG. 6 is a top view onto a mounting side 101 of an example carrier 100 on which a plurality of tufts 210, 220, 230 is mounted. For sake of simplicity, only the tufting areas of the plurality of tufts are shown. The plurality of tufts 210, 220, 230 comprises a first sub-plurality of tufts 210, a second sub-plurality of tufts 220, and a center tuft 230. The first sub-plurality of tufts 210 comprises eight tufts 211 to 218 that all have the same cross-sectional shape, which is an elongated, essentially banana-like shape (the shown cross-sectional shape may also be described as an annulus-like sector with semi-circular or rounded small sides). The tufts 211 to 218 of the first sub-plurality of tufts 210 are essentially mounted in a ring-like arrangement. The second sub-plurality of tufts 220 comprises eight tufts 221 to 228 that all have the same cross-sectional shape, which is an elliptical shape. The tufts 221 to 228 of the second sub-plurality of tufts 220 are essentially mounted in a ring-like arrangement. The center tuft 230 is mounted on the mounting side 101 such that its center point coincides with the center point 102 of the mounting side 101 of the carrier 100.

The tufts 211 to 218 of the first sub-plurality of tufts 210 all have the same cross-sectional shape, which is an essentially banana-like shape. The tufts 211 to 218 have a maximum length W1. The tufts 211 to 218 lie within an annulus 219 that does not cross any of the other tufts of the carrier 100.

The tufts 221 to 228 of the second sub-plurality of tufts each have a length W2 in the major axis extension direction and a width W3 in the minor axis extension direction. E.g. for tuft 228, the major axis extension direction Z8 is inclined with respect to a radial line originating at the center point 102 of the mounting side 101 of the carrier 100 and going through the center point of the tufting area (i.e. the center of the elliptical shape or, more generally, the center of the approximation ellipse) such that the major axis extension direction Z8 does not cross the tufting area of the center tuft 230.

In some embodiments, the tufting area of each of the tufts 211 to 218 of the first sub-plurality of tufts 210 is 2.82 mm$^2$ and the perimeter of each of these tufts is 7.80 mm, the tufting rea of each of the tufts 221 to 228 of the second sub-plurality of tufts 220 is 2.89 mm$^2$ and the perimeter of each of these tufts is 6.71 mm, and the tufting area of the center tuft is 5.38 mm$^2$ and its perimeter is 8.48 mm. In this embodiment, the width W1 of the tufts 211 to 218 is 3.35 mm (i.e. the largest extension of the tufts 211 to 218). The distance d between the circumferential edge of the carrier 100 and the respective closest point of each of the tufts 211 to 218 may be about 0.8 mm.

In some embodiments, in particular in the embodiments described in the previous paragraph, the tufts 211 to 218 of the first sub-plurality of tufts 210 are all mixed tufts (e.g. with an average percentage of non-tapered filaments being in the range of between 5% to 10%) comprising nominally about 140 to 150 filaments each and the filaments all having a diameter of 127 μm and the tufts 221 to 218 of the second sub-plurality of tufts 220 and the center tuft 230 are all non-tapered tufts, the tufts 221 to 228 comprising nominally about 140 to 150 filaments (due to manufacturing tolerances, the individual number of filaments per tuft may e.g. lie in a range of between 145 filaments and 155 filaments if the nominal count is 150) and the center tuft comprising nominally about 300 filaments, and all filaments having a diameter of 127 μm. All tufts in this embodiment are straight tufts, i.e. their height extension is perpendicular to the flat mounting side of the carrier. This shall not exclude that in other embodiments at least one of the tufts is inclined, i.e. has a height extension direction that forms an acute angle with respect to a normal of the mounting side, where the acute angle may lie in a range of between 1 degree and 30 degree, in particular in between 5 degrees and 20 degrees, further in particular in between 10 degrees and 18 degrees.

In some embodiments, in particular in the embodiments described in one or both of the previous two paragraphs, the height of the outer tufts 211 to 218 is 8.65 mm (the tufts having a flat, non-profiled surface), the height of the inner tufts 221 to 218 varies from 8.25 mm at the distal end of the ellipse (distal with respect to the center point 102 on the mounting surface 101) to 8.65 mm at the proximal end of the ellipse (where the free end surface is a flat, inclined surface as shown in FIG. 4A), and the height of the center tuft 230 is 7.80 mm, i.e. the center tuft 230 is somewhat retracted with respect to the surrounding inner and outer tufts 221 to 228 and 211 to 218. Then the faster moving tufts (where "faster" is meant with respect to a rotational or oscillating-rotational motion of the carrier around a rotation axis extending through the center point of the carrier) of the two rings come first into contact with the tooth surface or can penetrate into the interdental areas (in particular the outer mixed tufts 211 to 218 comprising the high percentage of tapered filaments).

Figure 7:
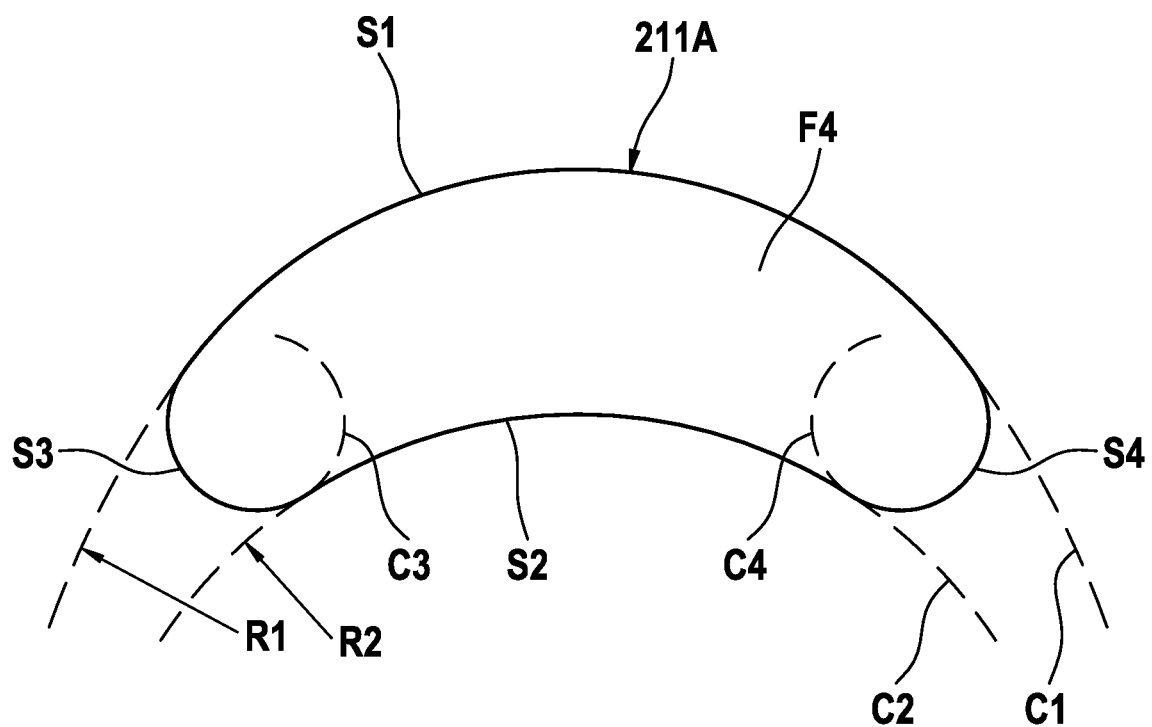
FIG. 7 is a depiction of an example elongated cross-sectional shape of a tuft defined via circular segments.

FIG. 7 is a depiction of one example embodiment of a specification of an elongated, essentially banana-like (or: annulus-like sector with semi-circular small sides) cross-sectional shape of a tuft (e.g. of the outer tufts 211-218 shown in FIG. 6). In this specification, the elongated cross-sectional shape is defined by four circular segments S1 to S4. The outer, convex segment S1 is a segment from a circle having a first diameter, e.g. 3.97 mm, the inner, concave segment S2 is a segment from a circle having a second diameter that may in particular be slightly different to the first diameter, e.g. 3.90 mm. Finally, the outer segments S3 and S4 are each segments from smaller circles having a third diameter that in particular is different to at least one of the first and second diameter, e.g. 0.66 mm.

Further Example Replaceable Brush Heads not Claimed but Considered Herein are:

In accordance with one aspect of the present disclosure, a replacement brush head for an electric toothbrush comprising a tubular housing attachable to and detachable from a handle of the electric toothbrush, a carrier having a mounting side, in particular having a circular, oval or elliptical mounting side, which carrier is mounted at the housing for driven oscillatory rotational motion around a rotation axis that extends through a center point on the mounting side of the carrier, a plurality of tufts comprising filaments, the tufts being mounted on the mounting side of the carrier, wherein a first sub-plurality of the tufts have an elongated cross-sectional shape perpendicular to their height extension direction, in particular wherein a long axis of the elongated shape of each of the tufts of the first sub-plurality of tufts has an angle with respect to a radial line originating at the center point on the mounting side and going through a center point of the respective tuft on the mounting side level that lies in a range of between ±5° and ±85°, in particular in a range of between ±30° and ±60°, and are mounted in an essentially ring-like arrangement on the mounting side of the carrier and wherein a second sub-plurality of tufts have an elongated cross-sectional shape perpendicular to their height extension direction, in particular wherein a long axis of the elongated shape of each of the tufts of the second sub-plurality of tufts has an angle with respect to a radial line originating at the center point on the mounting side and going through a center point of the respective tuft on the mounting side level that is between ±5° and ±85°, in particular between ±30° and ±60°, and are mounted in an essentially ring-like arrangement on the mounting side of the carrier within the ring-like arrangement of the first sub-plurality of tufts.

All further features already described in the present disclosure not already mentioned in above aspect may independently be added to the above aspect, e.g. the filament diameter of between 140 µm and 102 µm, the tufting area of at least 2.0 mm$^2$, the average filament height of at least 8.0 mm, or the presence of mixed tufts (in particular the first sub-plurality of tufts may all be mixed tufts and the tufts of the second sub-plurality may all be non-tapered tufts), the presence of a center tuft etc.

In accordance with one aspect of the present disclosure, a replacement brush head for an electric toothbrush comprising a tubular housing attachable to and detachable from a handle of the electric toothbrush, a carrier having a mounting side, in particular having a circular, oval or elliptical mounting side, which carrier is mounted at the housing for driven oscillatory rotational motion around a rotation axis that extends through a center point on the mounting side of the carrier, a plurality of tufts comprising filaments, the tufts being mounted on the mounting side of the carrier, wherein a first sub-plurality of tufts of the plurality of tufts is mounted on the mounting side of the carrier in an essentially ring-like arrangement, wherein each of the tufts of the first-sub-plurality of tufts has a general banana-like cross-sectional shape in a plane perpendicular to the height extension direction of the respective tuft, wherein the banana-like cross section is formed by an outer circular segment and an inner circular segment, which circular segments are connected at their ends, and wherein the banana-shaped tufts are arranged with their concave side towards the center point, in particular wherein each of the banana-like tufts are arranged with an inclination with respect to the center point.

All further features already described in the present disclosure not already mentioned in above aspect may independently be added to the above aspect, e.g. the filament diameter of between 140 µm and 102 µm, the tufting area of at least 2.0 mm$^2$, the average filament height of at least 8.0 mm, or the presence of mixed tufts (in particular the first sub-plurality of tufts may all be mixed tufts), the presence of a second ring-like arrangement of tufts, the presence of a center tuft etc.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A replaceable brush head for an electric toothbrush, comprising:
    a housing attachable to and detachable from a handle of the electric toothbrush;
    a carrier having a mounting side having a shape selected from a circular, oval, or elliptical shape, wherein the carrier is mounted at the housing for driven oscillatory rotational motion around a rotation axis that extends through a center point on the mounting side of the carrier;
    a plurality of tufts comprising filaments mounted on the mounting side of the carrier;
    wherein each of the tufts has a tufting area of at least about 2.4 mm$^2$, and the filaments in each of the tufts have a cross-sectional area perpendicular to their length extension direction that corresponds to a circular cross-sectional area having a diameter of between 0.102 mm and 0.127 mm;
    wherein the brush head comprises only the tufts of the defined tufting area and diameter.

2. The brush head in accordance with claim 1, wherein the average filament length of the filaments of the plurality of tufts is at least 8.0 mm.

3. The brush head in accordance with claim 1, wherein the plurality of tufts comprises a first sub-plurality of tufts comprising filaments having a tapered free end, wherein the first sub-plurality of tufts consists of at least five tufts.

4. The brush head in accordance with claim 3, wherein at least one mixed tapered tuft of the first sub-plurality of tufts comprises at least one filament having a non-tapered free end, while the other filaments of the mixed tuft are filaments having tapered free ends, wherein from 1% to 20% of the filaments of the mixed tuft have a non-tapered free end, while the other filaments of the mixed tuft are filaments having tapered free ends, wherein from 2% to 10% of the filaments of the mixed tuft have a non-tapered free end.

5. The brush head in accordance with claim 3, wherein the tufts of the first sub-plurality of tufts have an elongated cross-sectional shape in a plane perpendicular to their height extension direction, wherein a major axis of an approximation ellipse of the elongated shape of each of the tufts of the first sub-plurality of tufts has an angle with respect to a radial line originating at the center point on the mounting side and going through a center point of the respective tuft on the mounting side level that lies in a range of between ±5° and ±85°.

6. The brush head in accordance with claim 5, wherein the tufts having an elongated cross-sectional shape have a maximal width of at least 3.2 mm.

7. The brush head in accordance with claim 5, wherein the angle is between ±30° and ±60°.

8. The brush head in accordance with claim 3, wherein the tufts of the first sub-plurality of tufts are mounted on the mounting side of the carrier in an essentially ring-like arrangement.

9. The brush head in accordance with claim 3, wherein the first sub-plurality of tufts consists of eight tufts.

10. The brush head in accordance with claim 1, wherein the plurality of tufts comprises a second sub-plurality of tufts that comprise only tufts with filaments having non-tapered free ends, and wherein the second sub-plurality of tufts comprises at least five tufts.

11. The brush head in accordance with claim 10, wherein the tufts of the second sub-plurality of tufts have an elongated cross-sectional shape in a plane perpendicular to their height extension direction, in particular wherein a major axis of an approximation ellipse of the elongated shape of each of the tufts of the second sub-plurality of tufts has an angle with respect to a radial line originating at the center point on the mounting side and going through a center point of the respective tuft on the mounting side level that is between ±5° and ±85°.

12. The brush head in accordance with claim 11, wherein the angle is between ±30° and ±60°.

13. The brush head in accordance with claim 10, wherein the tufts of the second sub-plurality of tufts are mounted on the mounting side of the carrier in an essentially ring-like arrangement, wherein the ring of tufts of the second sub-plurality of tufts is arranged inside of the ring of tufts of the first sub-plurality of tufts.

14. The brush head in accordance with claim 1, wherein the plurality of tufts comprises a central tuft having a central point on the level of the mounting side of the carrier that essentially coincides with the central point of the mounting side, wherein the tufting area of the central tuft is at least about 5.0 mm$^2$.

15. The brush head in accordance with claim 14, wherein a virtual extensions of each of the major axes of the approximation ellipses of the second plurality of tufts does not cross the tufting area of the central tuft.

16. The brush head in accordance with claim 1, wherein the tufting area of the plurality of tufts is at least about 25% of the area of the mounting side.

17. The brush head in accordance with claim 16, wherein the tufting area of the plurality of tufts is at least 28% or at least 30%.

18. The brush head in accordance with claim 1, wherein the number of filaments per unit area on the carrier is at least 15 per mm$^2$.

19. The brush head in accordance with claim 1, wherein each of the tufts has a tufting area of at least about 2.80 mm$^2$.

20. An electric toothbrush comprising: a brush head, with a housing attachable to and detachable from a handle of the electric toothbrush;

a carrier having a mounting side having a shape selected from a circular, oval, or elliptical shape, wherein the carrier is mounted at the housing for driven oscillatory rotational motion around a rotation axis that extends through a center point on the mounting side of the carrier, wherein the electric toothbrush is arranged to drive the carrier such that any filament having a tapered free end travels along a path of more than 3.0 mm per half cycle of each oscillation period;

a plurality of tufts comprising filaments mounted on the mounting side of the carrier;

wherein each of the tufts has a tufting area of at least about 2.4 mm$^2$, and the filaments in each of the tufts have a cross-sectional area perpendicular to their length extension direction that corresponds to a circular cross-sectional area having a diameter of between 0.102 mm and 0.127 mm;

wherein the brush head comprises only the tufts of the defined tufting area and diameter.

* * * * *